(12) United States Patent
Chang et al.

(10) Patent No.: US 12,461,372 B2
(45) Date of Patent: Nov. 4, 2025

(54) WEARABLE DISPLAY DEVICE AND PROJECTION DEVICE

(71) Applicant: Coretronic Corporation, Hsin-Chu (TW)

(72) Inventors: Chih-Wei Chang, Hsin-Chu (TW); Chin-Sheng Chao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 463 days.

(21) Appl. No.: 17/976,874

(22) Filed: Oct. 31, 2022

(65) Prior Publication Data
US 2023/0147618 A1 May 11, 2023

Related U.S. Application Data

(60) Provisional application No. 63/275,963, filed on Nov. 5, 2021.

(30) Foreign Application Priority Data

Dec. 17, 2021 (CN) .......................... 202111548775.9

(51) Int. Cl.
*G02B 27/01* (2006.01)
*G02B 27/10* (2006.01)
*H04N 9/31* (2006.01)

(52) U.S. Cl.
CPC ....... *G02B 27/0172* (2013.01); *G02B 27/106* (2013.01); *H04N 9/3152* (2013.01); *G02B 2027/0178* (2013.01)

(58) Field of Classification Search
None
See application file for complete search history.

(56) References Cited

U.S. PATENT DOCUMENTS

| 5,816,675 A | 10/1998 | Brice et al. |
| 2008/0049190 A1* | 2/2008 | Destain .................. G02B 13/16 353/20 |

(Continued)

FOREIGN PATENT DOCUMENTS

| CN | 110120992 | 8/2019 |
| CN | 110244503 | 9/2019 |

(Continued)

OTHER PUBLICATIONS

"Office Action of Taiwan Counterpart Application", issued on Dec. 6, 2022, p.1-p. 8.

(Continued)

*Primary Examiner* — Toan Ton
*Assistant Examiner* — Danell L Owens
(74) *Attorney, Agent, or Firm* — JCIPRNET

(57) ABSTRACT

A wearable display device includes an optical waveguide element and a projection device. The projection device includes an optical engine main body, at least one light emitting unit, an optical combiner, and a projection lens. The optical engine main body has at least one positioning structure. The light emitting unit is connected to the optical engine main body and configured to emit an illumination beam. The optical combiner is disposed in the optical engine main body and positioned at the positioning structure, the optical combiner is located on a transmission path of the illumination beam, and the optical combiner is configured to guide the illumination beam to form an image beam. The projection lens is connected to the optical engine main body, and the projection lens is located on a transmission path of the image beam and configured to project the image beam to the optical waveguide element.

12 Claims, 12 Drawing Sheets

(56) References Cited

U.S. PATENT DOCUMENTS

| | | | |
|---|---|---|---|
| 2017/0237935 A1 | 8/2017 | Totani et al. | |
| 2019/0179149 A1* | 6/2019 | Curtis et al. | |
| 2020/0285064 A1* | 9/2020 | Takeda | G02B 27/0172 |
| 2021/0132398 A1 | 5/2021 | Fujishiro | |
| 2022/0310764 A1 | 9/2022 | Kodama et al. | |

FOREIGN PATENT DOCUMENTS

| | | |
|---|---|---|
| CN | 110850669 | 2/2020 |
| CN | 111665627 | 9/2020 |
| CN | 113253462 | 8/2021 |
| CN | 113490873 | 10/2021 |
| CN | 113544560 | 10/2021 |
| JP | 2018116261 | 7/2018 |
| KR | 20240041547 | 4/2024 |
| TW | 201227082 | 7/2012 |
| TW | 202036092 | 10/2020 |

OTHER PUBLICATIONS

"Notice of Allowance of U.S. Appl. No. 18/180,799 ," issued on Aug. 20, 2024, p. 1-p. 9, in which the listed reference was/references were cited.

"Search Report of Europe Counterpart Application", issued on Apr. 11, 2023, p. 1-p. 7.

"Office Action of U.S. Appl. No. 18/180,799", issued on Feb. 22, 2024, p. 1-p. 20.

"Office Action of China Counterpart Application", issued on Mar. 31, 2025, p. 1-p. 8.

* cited by examiner

WEARABLE DISPLAY DEVICE AND PROJECTION DEVICE

CROSS-REFERENCE TO RELATED APPLICATION

This application claims the priority benefit of U.S. provisional application Ser. No. 63/275,963, filed on Nov. 5, 2021 and China application serial no. 202111548775.9, filed on Dec. 17, 2021. The entirety of the above-mentioned patent application is hereby incorporated by reference herein and made a part of this specification.

BACKGROUND

Technical Field

The disclosure relates to a display device and a projection device, in particular, the disclosure relates to a wearable display device and a projection device included therein.

Description of Related Art

Gaining increasing popularity in consumer markets in recent years, wearable display devices with augmented reality (AR) or virtual reality (VR) functions project an image beam onto an optical waveguide element by a projection device for users to experience virtual reality. The volume and weight of the wearable display device need to be reduced as much as possible so that the user may wear it easily. The projection device in the current wearable display device mostly adopts a framework of a light emitting diode (LED) module with digital micromirror devices (DMD). However, the current projection device needs to cooperate with a complex optical path guidance and imaging system, and uses a precise optical engine system to position each element inside the projection device, which leads to an increase in the size and weight of the wearable display device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure is directed to a wearable display device, in which a projection device complies with design requirements of reduced volume and weight.

The disclosure is directed to a projection device, which complies with design requirements of reduced volume and weight.

Other objectives and advantages of the disclosure may be further illustrated by the technical features broadly embodied and described as follows.

In order to achieve one or a portion of or all of the objectives or other objectives, an embodiment of the disclosure provides a wearable display device including an optical waveguide element and a projection device. The projection device includes an optical engine main body, at least one light emitting unit, an optical combiner and a projection lens. The optical engine main body has at least one positioning structure. The light emitting unit is connected to the optical engine main body and configured to emit an illumination beam. The optical combiner is disposed in the optical engine main body and positioned at the positioning structure, the optical combiner is located on a transmission path of the illumination beam, and the optical combiner is configured to guide the illumination beam to form an image beam. The projection lens is connected to the optical engine main body, and the projection lens is located on a transmission path of the image beam and configured to project the image beam to the optical waveguide element.

In order to achieve one or a portion of or all of the objectives or other objectives, an embodiment of the disclosure provides a projection device including an optical engine main body, at least one light emitting unit, an optical combiner and a projection lens. The optical engine main body has at least one positioning structure. The light emitting unit is connected to the optical engine main body and configured to emit an illumination beam. The optical combiner is disposed in the optical engine main body and positioned at the positioning structure, the optical combiner is located on a transmission path of the illumination beam, and the optical combiner is configured to guide the illumination beam to form an image beam. The projection lens is connected to the optical engine main body, and the projection lens is located on a transmission path of the image beam and configured to project the image beam out.

In an embodiment of the disclosure, the optical engine main body has at least one first positioning portion, and the at least one first positioning portion includes at least one of a positioning hole and a positioning groove.

In an embodiment of the disclosure, the optical engine main body has a positioning surface and a plurality of connecting surfaces, each connecting surface is adjacent to the positioning surface, the at least one light emitting unit and the projection lens are respectively connected to the connecting surfaces, and the at least one first positioning portion is located on the positioning surface.

In an embodiment of the disclosure, the light emitting unit has at least one second positioning portion, and the at least one second positioning portion includes at least one of a positioning hole and a positioning edge.

In an embodiment of the disclosure, the light emitting unit includes a light emitting assembly and a back plate. The back plate has a front surface and a back surface opposite to each other, the front surface faces the optical engine main body, the light emitting assembly is disposed on the front surface, and the at least one second positioning portion is located on the back surface.

In an embodiment of the disclosure, the optical engine main body has a plurality of connecting surfaces, the at least one light emitting unit and the projection lens are respectively connected to the connecting surfaces, where at least one of the connecting surfaces has at least one dispensing groove.

In an embodiment of the disclosure, the positioning structure includes at least one of a positioning chute, a positioning hole, and a positioning block.

In an embodiment of the disclosure, a volume of the projection device is not more than 1.5 cubic centimeters.

Based on the above devices, the embodiments of the disclosure have at least one of the following advantages or effects. In the projection device of the disclosure, the illumination beam emitted by the at least one light emitting unit is guided by the optical combiner to become the image beam, and the image beam may be directly projected to the optical waveguide element by the projection lens to display an image frame. Moreover, the optical combiner is precisely positioned by the positioning structure of the optical engine main body. Compared with a framework in which a projection device in a conventional head-mounted (wearable) display device adopts a light emitting diode module with DMD, the wearable display device and the projection device of the disclosure may omit configuration of the DMD or other types of light valves, and is unnecessary to use a complex optical path guidance and imaging system, and unnecessary to use a precise optical engine system to position each element inside the projection device, which is more in line with the design requirements of reduced volume and weight.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
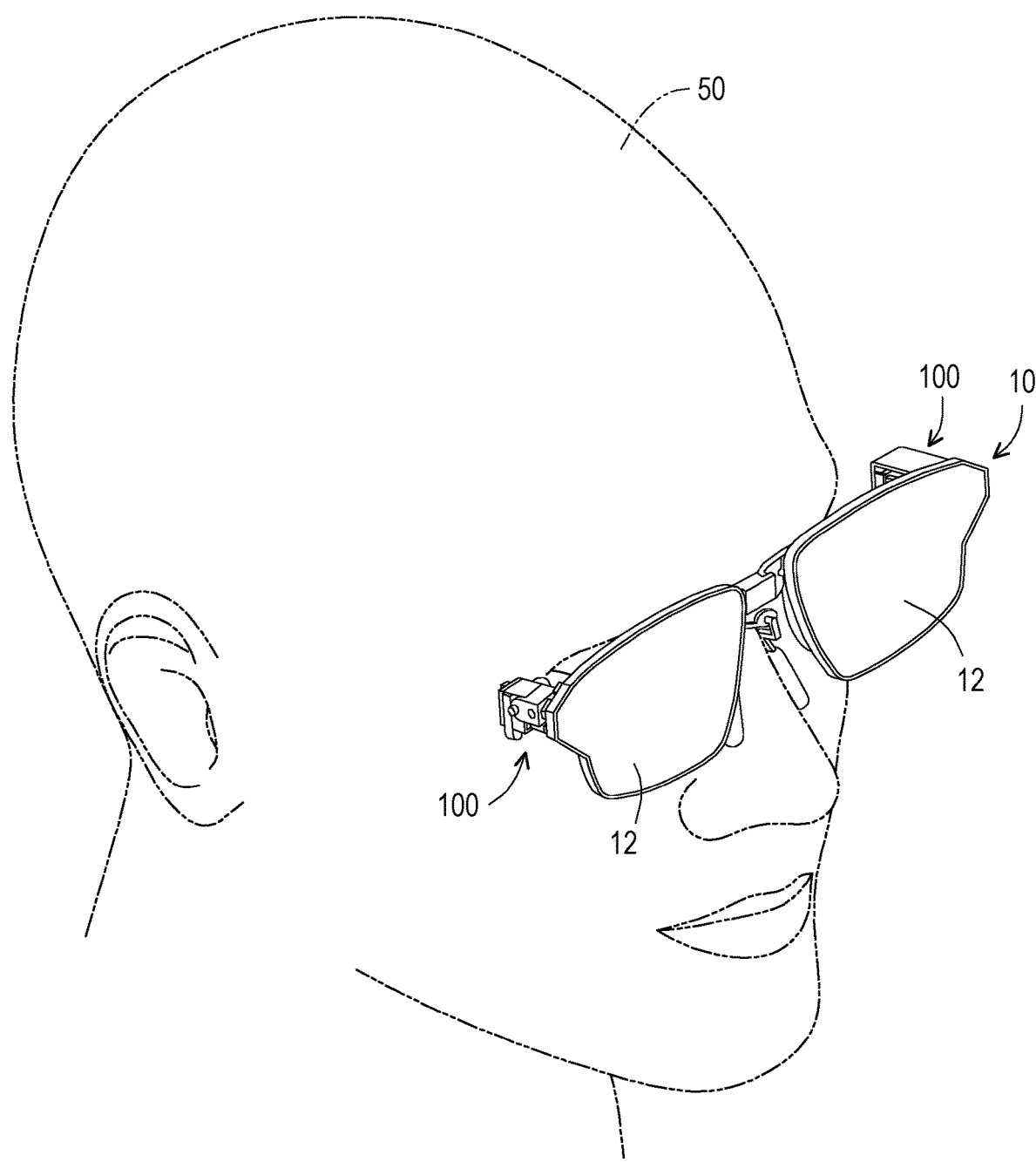
FIG. 1 is a three-dimensional view of a wearable display device worn by a user according to an embodiment of the disclosure.
Figure 2:
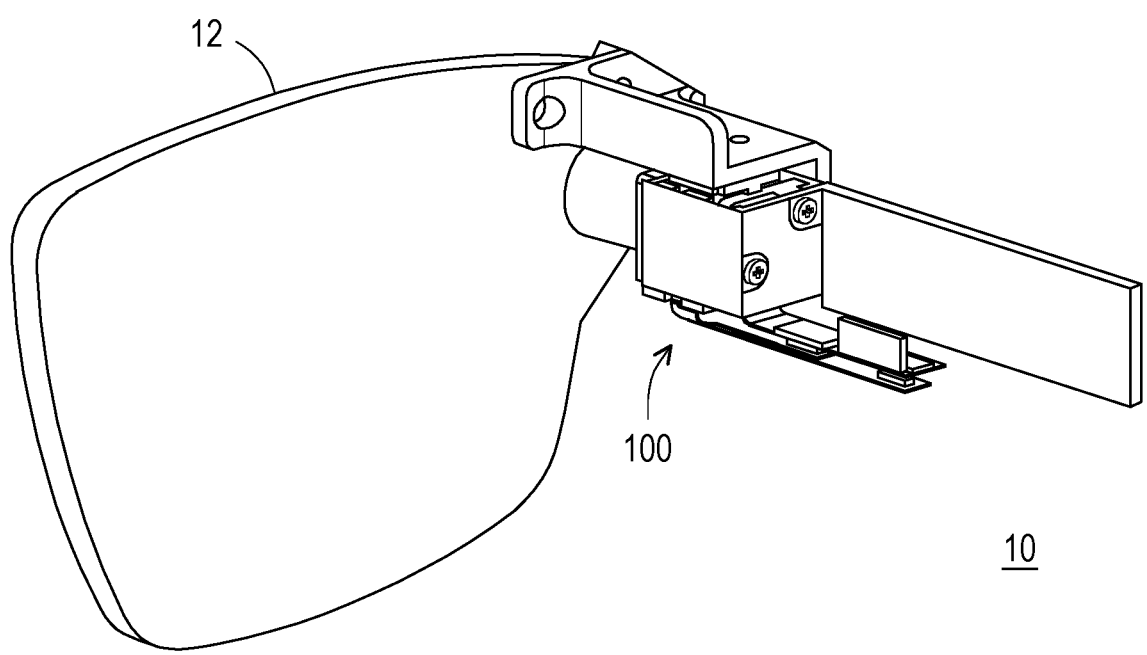
FIG. 2 is a three-dimensional view of partial components of the wearable display device of FIG. 1.

FIG. 1 is a three-dimensional view of a wearable display device worn by a user according to an embodiment of the disclosure. FIG. 2 is a three-dimensional view of partial components of the wearable display device of FIG. 1. Referring to FIG. 1 and FIG. 2, the wearable display device 10 of the embodiment includes at least one optical waveguide element 12 (two optical waveguide elements 12 are shown in FIG. 1) and at least one projection device 100 (two projection devices 100 are shown in FIG. 1). The wearable display device 10 may be worn on a user 50 as shown in FIG. 1, so that the two optical waveguide elements 12 respectively correspond to the two eyes of the user 50, and each projection device 100 is configured to project an image beam to the corresponding optical waveguide element 12, and then provide the user 50 with an image experience of augmented reality (AR) or virtual reality (VR) through optical structures included in the optical waveguide element 12 such as a diffractive structure or a light splitting element, etc.

Figure 3:
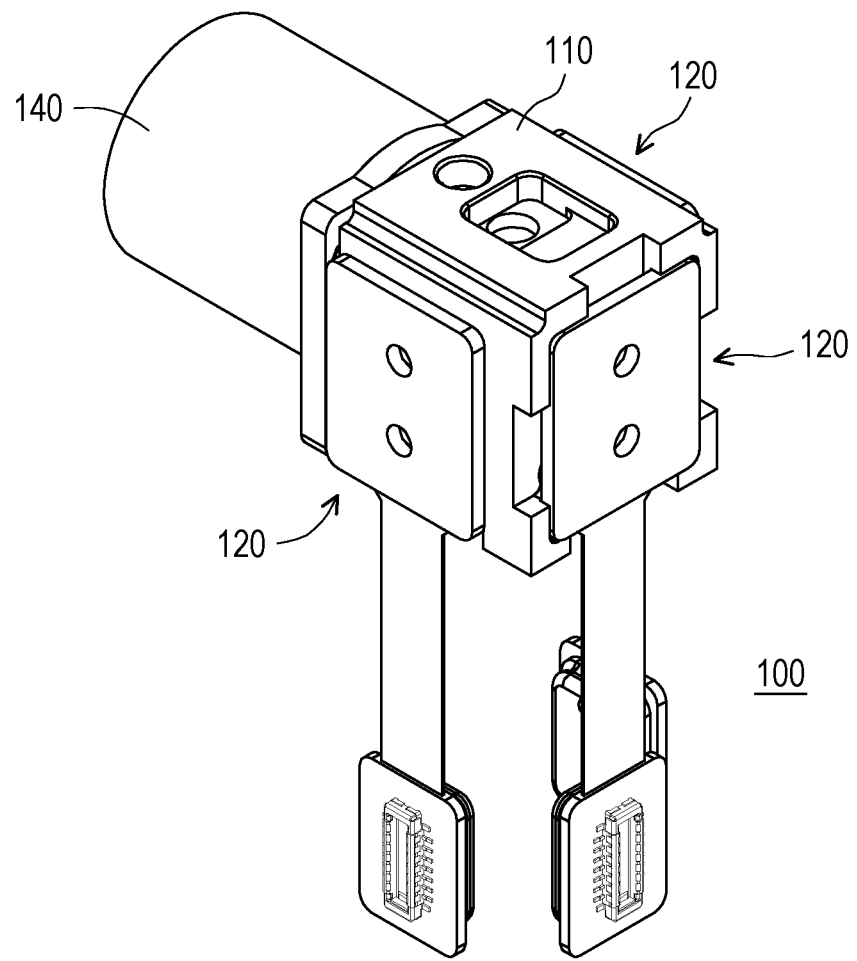
FIG. 3 is a three-dimensional view of partial components a projection device of FIG. 2.
Figure 4:
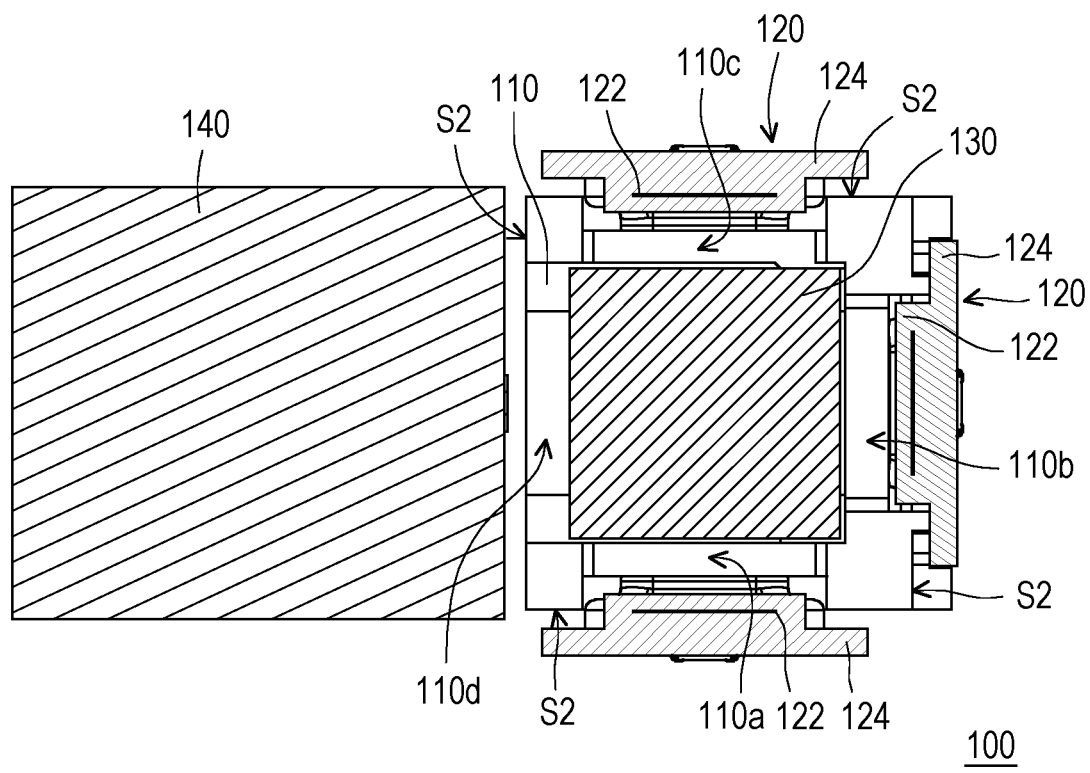
FIG. 4 is a cross-sectional view of the projection device of FIG. 3.
Figure 5:
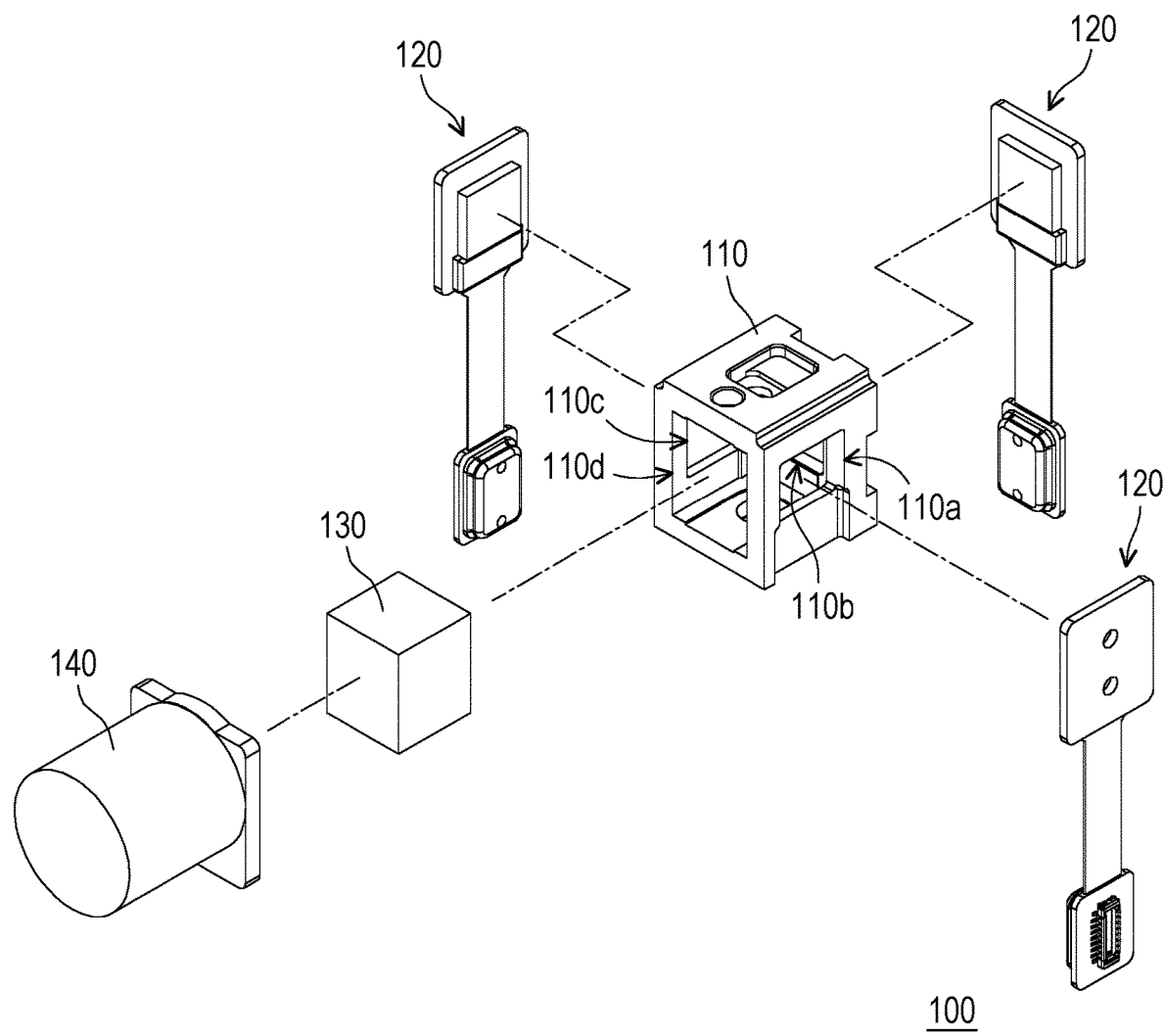
FIG. 5 is an exploded view of the projection device of FIG. 3.
Figure 6:
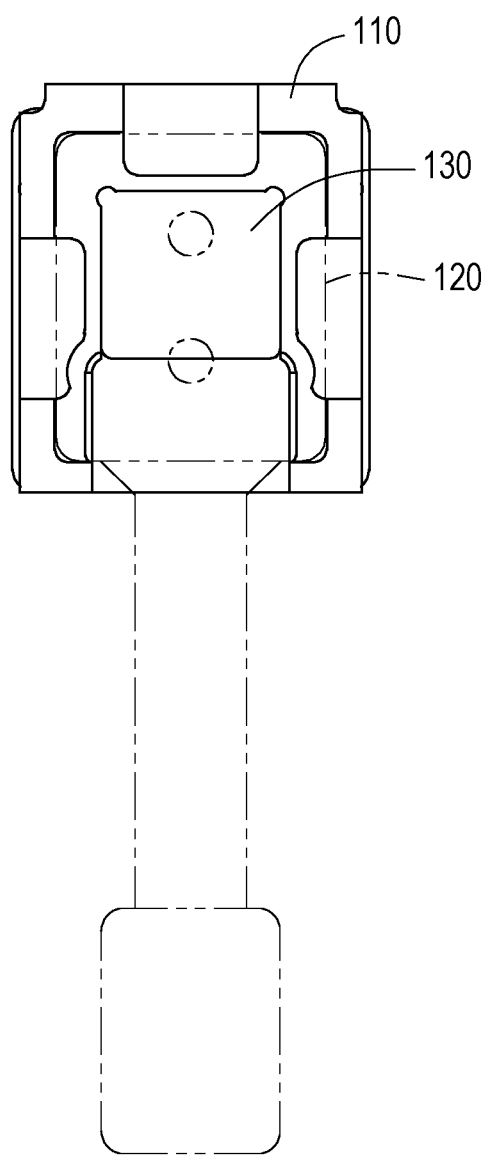
FIG. 6 is a rear view of the projection device of FIG. 3.

FIG. 3 is a three-dimensional view of partial components the projection device of FIG. 2. FIG. 4 is a cross-sectional view of the projection device of FIG. 3. FIG. 5 is an exploded view of the projection device of FIG. 3. FIG. 6 is a rear view of the projection device of FIG. 3, where a light emitting unit 120 is shown as transparent to show an optical combiner 130 in an optical engine main body 110. Referring to FIG. 3 to FIG. 6, the projection device 100 of the embodiment includes the optical engine main body 110, at least one light emitting unit 120 (a plurality of light emitting units are shown in the figure), the optical combiner 130 and a projection lens 140. The plurality of light emitting units 120 are, for example, a red micro light emitting diode, a green micro light emitting diode and a blue micro light emitting diode, respectively, and are connected to the optical engine main body 110. The optical engine main body 110 is, for example, a frame and has a plurality of openings 110a-110d. The optical combiner 130 is disposed in the optical engine maim body 110, and the light emitting units 120 respectively face the optical combiner 130 through the openings 110a-110c of the optical engine main body 110. The projection lens 140 is connected to the optical engine main body 110, and the opening 110d is located between the projection lens 140 and the optical combiner 130.

Figure 7:
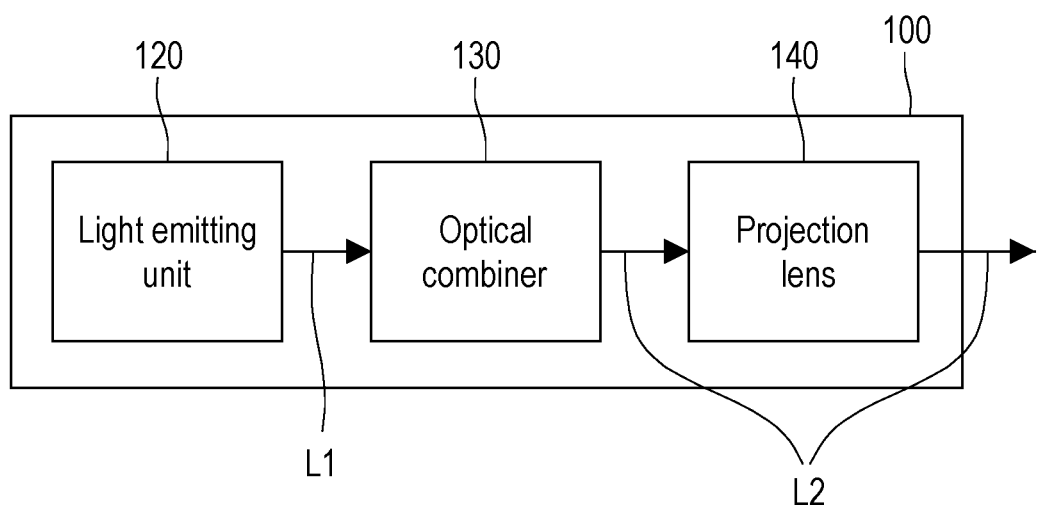
FIG. 7 is a schematic diagram of the projection device of FIG. 3.

FIG. 7 is a schematic diagram of the projection device of FIG. 3. Referring to FIG. 7, the light emitting unit 120 is configured to emit an illumination beam L1. The optical combiner 130 is located on a transmission path of the illumination beam L1, and the optical combiner 130 is configured to guide the illumination light beam L1 to form an image beam L2. The projection lens 140 is located on a transmission path of the image beam L2 and configured to project the image beam L2 to the optical waveguide element 12 (shown in FIG. 1 and FIG. 2). The illumination beam L1 includes at least one of red light, green light and blue light. For example, red light emitted by a red micro light emitting diode is reflected by the optical combiner 130 to enter the projection lens 140, blue light emitted by a blue micro light emitting diode is reflected by the optical combiner 130 to enter the projection lens 140, and green light emitted by the green micro light emitting diode passes through the optical combiner 130 to enter the projection lens 140. The image beam L2 formed by at least one of the red light, green light and blue light (i.e., the aforementioned illumination beam L1) is transmitted to the optical waveguide element 12 through the projection lens 140, and the user may observe an image formed by the image beam L2.

As described above, in the projection device 100 of the embodiment, the illumination beam L1 emitted by the light emitting units 120 is guided by the optical combiner 130 to form the image beam L2, and the image beam L2 may be directly projected to the optical waveguide element 12 by the projection lens 140 to display an image frame. Compared with the framework in which the projection device in the conventional head-mounted (wearable) display device adopts the light emitting diode module with the DMD, the projection device 100 of the embodiment may omit configuration of the DMD or other types of light valves, and is unnecessary to use a complex optical path guidance and imaging system, and unnecessary to use a precise optical engine system to position each element inside the projection device, which is more in line with the design requirements of reduced volume and weight. In the embodiment, a volume of the projection device 100 is, for example, not greater than 1.5 cubic centimeters.

Figure 8:
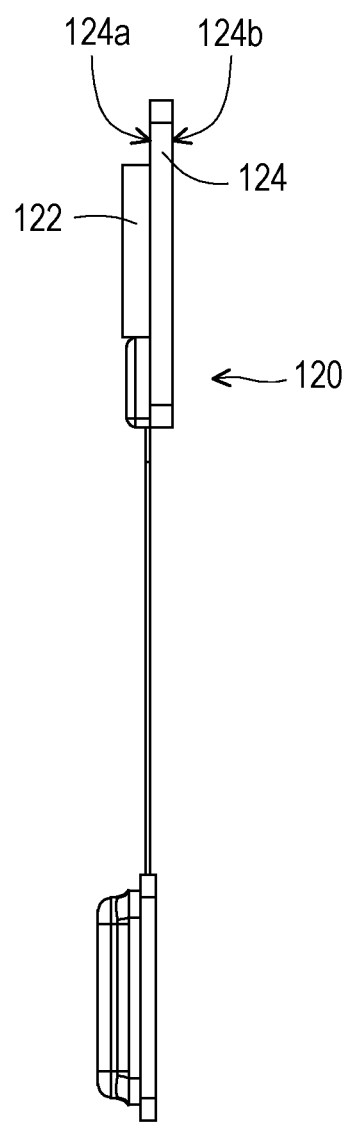
FIG. 8 is a side view of a light emitting unit of FIG. 6.

FIG. 8 is a side view of the light emitting unit of FIG. 6. Referring to FIG. 6 and FIG. 8, the light-emitting unit 120 of the embodiment includes a light emitting assembly 122 and a back plate 124. The back plate 124 has a front surface 124a and a back surface 124b opposite to each other, where the front surface 124a faces the optical engine main body 110 (shown in FIG. 6), and the light emitting assembly 122 is disposed on the front surface 124a and faces the optical combiner 130 in the optical engine main body 110. In the embodiment, the light emitting unit 120 is fixedly connected to the optical engine main body 110. To be specific, the light emitting unit 120 is, for example, fixedly connected to the optical engine main body 110 through a structural feature of the front surface 124a or through additional structural components. The back surface 124b of the back plate 124 may be configured with a heat-dissipating material such as heat sinks, graphite sheets, copper foils, etc., to improve heat dissipation efficiency. In the embodiment, the light emitting assembly 122 may include a micro light emitting diode array, and the micro light emitting diode array at least partially emits light according to an image to be displayed. In the embodiment, the three light emitting assemblies 122 respectively emit red light, green light, and blue light (i.e., the aforementioned illumination beam L1) simultaneously or not simultaneously at specific array positions, and the image beam L2 is formed after being guided by the optical combiner 130.

Figure 9:
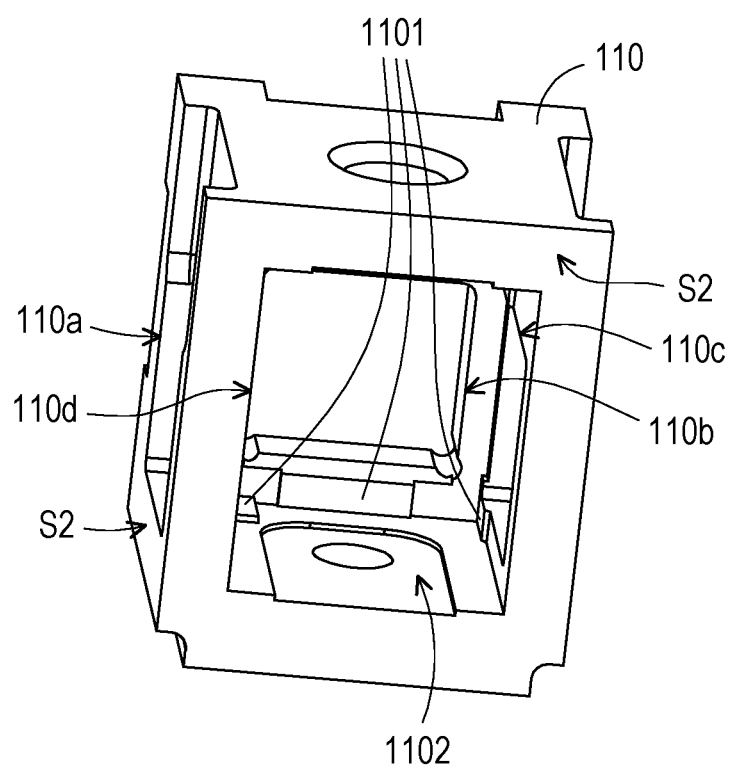
FIG. 9 is a three-dimensional view of an optical engine main body according to an embodiment of the disclosure.
Figure 10:
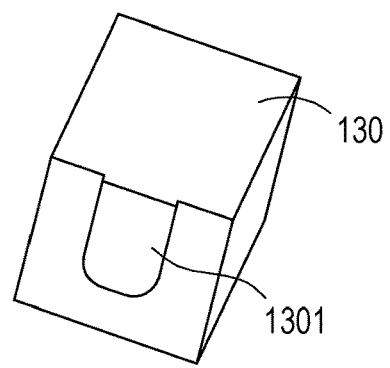
FIG. 10 is a three-dimensional view of an optical combiner according to an embodiment of the disclosure.

FIG. 9 is a three-dimensional view of an optical engine main body according to an embodiment of the disclosure. FIG. 10 is a three-dimensional view of an optical combiner according to an embodiment of the disclosure. Referring to FIG. 9 and FIG. 10, the optical engine main body 110 of the embodiment has a plurality of positioning structures. In the embodiment, the optical engine main body 110 is embodied as having three positioning blocks 1101 and a positioning chute 1102, and the optical combiner 130 is positioned at these positioning structures. To be specific, the three positioning blocks 1101 respectively lean against the optical combiner 130 in three axial directions perpendicular to each other. Moreover, as shown in FIG. 10, the optical combiner 130 has a boss 1301 corresponding to the positioning chute 1102, and the boss 1301 is positioned on the positioning chute 1102 in a sliding manner. In the embodiment, the optical combiner 130 is, for example, a combined prism or other optical elements capable of combining a plurality of light path, and a material of the optical combiner 130 is, for example, glass or a transparent plastic material.

Figure 11:
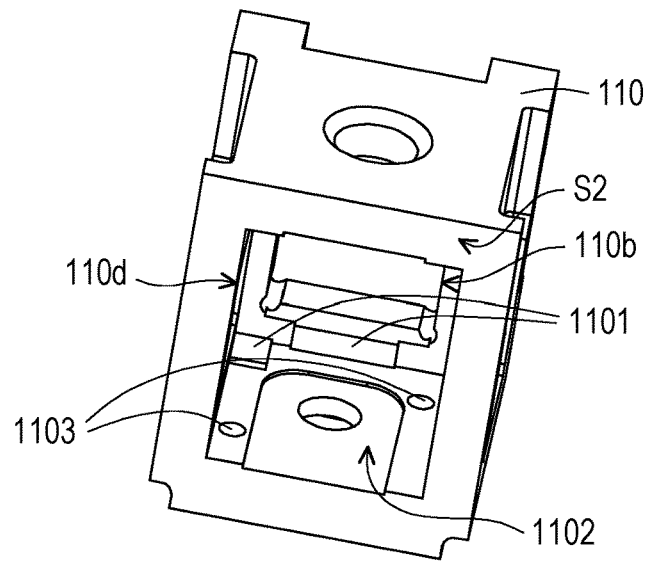
FIG. 11 is a three-dimensional view of an optical engine main body according to another embodiment of the disclosure.
Figure 12:
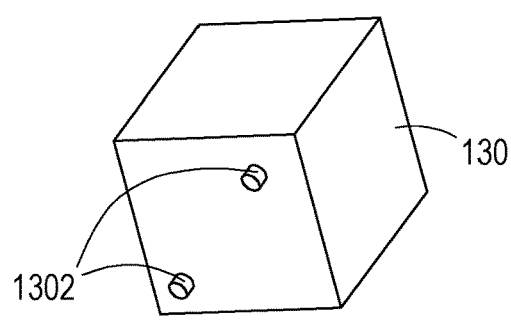
FIG. 12 is a three-dimensional view of an optical combiner corresponding to the optical engine main body of FIG. 11.

The positioning structure of the embodiment of the disclosure has various forms, which is described below with reference of following figures. FIG. 11 is a three-dimensional view of an optical engine main body according to another embodiment of the disclosure. FIG. 12 is a three-dimensional view of an optical combiner corresponding to the optical engine main body of FIG. 11. A difference between the embodiment shown in FIG. 11 and FIG. 12 and the previous embodiment (FIG. 9 and FIG. 10) is that the positioning structure of the optical engine main body 110 shown in FIG. 11 further includes a plurality of positioning holes 1103 on a plane, and in the embodiment, the optical engine main body 110 is embodied as having two positioning holes 1103, and the optical combiner 130 shown in FIG. 12 correspondingly has positioning protrusions 1302, and in the embodiment, the optical combiner 130 is embodied as having two positioning protrusions 1302. The positioning protrusions 1302 of the optical combiner 130 may be positioned in the positioning holes 1103 of the optical engine main body 110. In another embodiment, the positioning structure of the optical engine main body 110 may only include three positioning blocks 1101, and an outer surface of the optical combiner 130 leans against the three positioning blocks 1101, so that the optical combiner 130 may be positioned to the optical engine main body 110. Alternatively, the positioning structure of the optical engine main body 110 may only include two positioning blocks 1101 and one positioning chute 1102, and the embodiment of the disclosure does not limit the specific numbers of the positioning blocks 1101 and the positioning chute 1102.

Figure 13:
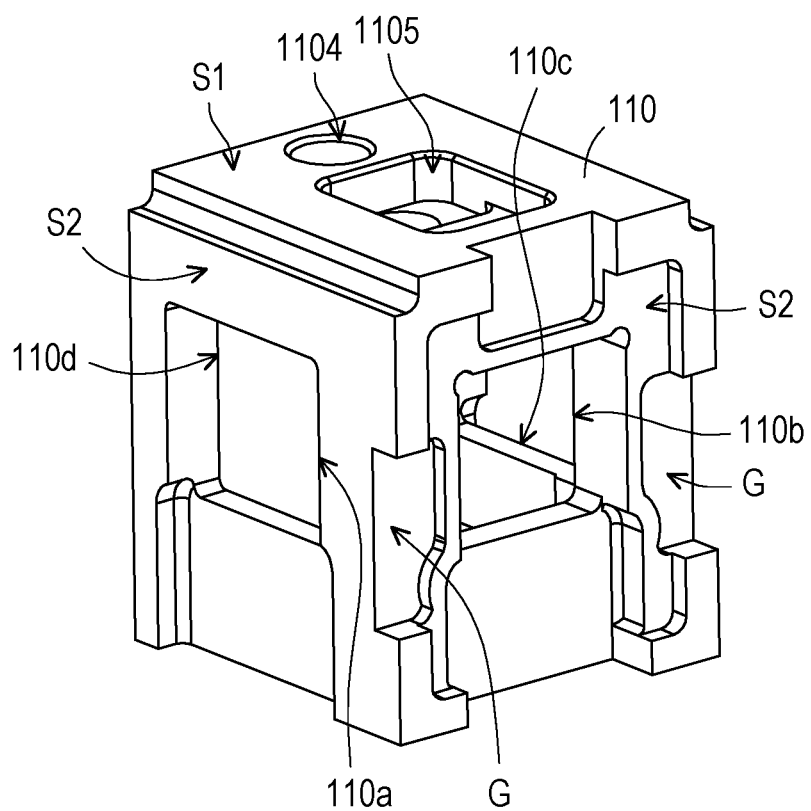
FIG. 13 is a three-dimensional view of an optical engine main body of FIG. 3.
Figure 14:
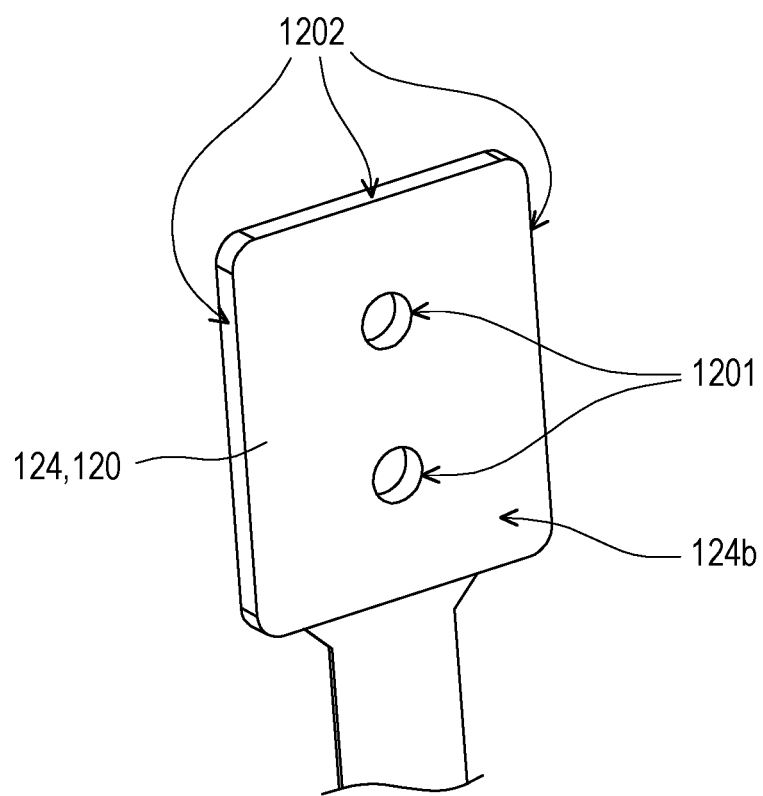
FIG. 14 is a three-dimensional view of partial components of a light emitting unit of FIG. 3.

FIG. 13 is a three-dimensional view of the optical engine main body of FIG. 3. FIG. 14 is a three-dimensional view of partial components of the light emitting unit of FIG. 3. Referring to FIG. 13 first, the optical engine main body 110 of the embodiment has a positioning surface S1 and a plurality of connecting surfaces S2, and each connecting surface S2 is adjacent to the positioning surface S1. In the embodiment, the connecting surfaces S2 respectively have openings 110a-110d, and the plurality of light emitting units 120 and the projection lens 140 may be respectively connected to the connecting surfaces S2 by gluing, buckling, and/or positioning holes, etc. The optical engine main body 110 has a plurality of first positioning portions on the positioning surface S1. In the embodiment, the first positioning portions are embodied as having a positioning hole 1104 and a positioning groove 1105. In addition, as shown in FIG. 14, the light emitting unit 120 has a second positioning portion. In the embodiment, the second positioning portion is embodied as having positioning holes 1201 and positioning edges 1202. The positioning holes 1201 are located on the back surface 124b of the back plate 124, and the positioning edges 1202 are side edges of the back plate 124. During a process of assembling the projection device 100, the first positioning portions and the second positioning portions may be positioned by a positioning machine, so that the projection device 100 may be assembled accurately. The second positioning portion of the light emitting unit 120 includes at least two positioning holes 1201, or the second positioning portion includes at least one positioning hole 1201 and one positioning edge 1202, so that the positioning machine may position the light emitting unit 120. The positioning hole 1201 may be, for example, a circular positioning hole or round positioning hole, and the disclosure does not limit a specific appearance of the positioning hole 1201. In addition, a diameter of the positioning hole 1201 is, for example, greater than 0.8 mm, a depth of the positioning hole 1201 is, for example, greater than 0.3 mm, and a length of the positioning edge 1202 is, for example, greater than 0.3 mm to facilitate the positioning machine positioning the light emitting unit 120. In other embodiments, the positioning machine may not only position the positioning holes 1201 and/or the positioning edges 1202 of the back plate 124 as described above, but may also position a cover class of the light emitting assembly 122. The positioning machine may, for example, perform six-axis (up and down, left and right, front and rear) positioning on the light emitting unit 120 of the projection device 100, and positioning accuracy thereof may, for example, reach 4 μm. In an embodiment, the positioning machine is, for example, an auto alignment (AA) optical engine.

In an embodiment, referring to FIG. 13, the connecting surfaces S2 of the optical engine main body 110 further has a dispensing groove G, which is used for pre-dispensing adhesive before the optical engine main body 110 and the light emitting unit 120 or the projection lens 140 are positioned and assembled, so that the corresponding light emitting unit 120 or the projection lens 140 is adhered to the connecting surface S2 after positioning and assembling. In another embodiment, each connecting surface S2 may not have the dispensing groove, and pre-dispensing may be directly performed on the connecting surface S2 so that the corresponding light emitting unit 120 or the projection lens 140 is adhered to the connecting surface S2 after positioning and assembling. In the embodiment, a dispensing width on the connecting surface S2 is, for example, greater than 0.5 mm, and a dispensing thickness is, for example, less than 0.5 mm.

In summary, the embodiments of the disclosure have at least one of the following advantages or effects. In the projection device of the disclosure, the illumination beam emitted by the light emitting unit is guided by the optical combiner to become the image beam, which may be directly projected to the optical waveguide element by the projection lens to display an image frame. Moreover, the optical combiner is precisely positioned by the positioning structure of the optical engine main body, and the optical engine main body o and the light emitting unit may have positioning portions, which are used by the positioning machine for positioning during the assembling process. Compared with a framework in which a projection device in a conventional head-mounted (wearable) display device adopts a light emitting diode module with DMD, the wearable display device and the projection device of the disclosure may omit configuration of the DMD or other types of light valves, and is unnecessary to use a complex optical path guidance and imaging system, and unnecessary to use a precise optical engine system to position each element inside the projection device, which is more in line with the design requirements of reduced volume and weight.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention," or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wearable display device, comprising:
    an optical waveguide element; and
    a projection device, comprising:
        an optical engine main body, having at least one positioning structure, at least one first positioning portion, a positioning surface and a plurality of connecting surfaces, wherein the at least one first positioning portion comprises at least one of a positioning hole and a positioning groove, each of the plurality of connecting surfaces is adjacent to the positioning surface, and the at least one first positioning portion is located on the positioning surface;

at least one light emitting unit, connected to the optical engine main body and configured to emit an illumination beam;

an optical combiner, disposed in the optical engine main body and positioned at the at least one positioning structure, wherein the optical combiner is located on a transmission path of the illumination beam, and the optical combiner is configured to guide the illumination beam to form an image beam; and a projection lens, connected to the optical engine main body, wherein the projection lens is located on a transmission path of the image beam and configured to project the image beam to the optical waveguide element, and the at least one light emitting unit and the projection lens are respectively connected to the plurality of connecting surfaces.

2. The wearable display device according to claim 1, wherein the at least one light emitting unit has at least one second positioning portion, and the at least one second positioning portion comprises at least one of a positioning hole and a positioning edge.

3. The wearable display device according to claim 2, wherein the at least one light emitting unit comprises a light emitting assembly and a back plate, the back plate has a front surface and a back surface opposite to each other, the front surface faces the optical engine main body, the light emitting assembly is disposed on the front surface, and the at least one second positioning portion is located on the back surface.

4. The wearable display device according to claim 1, wherein the at least one positioning structure comprises at least one of a positioning chute, a positioning hole, and a positioning block.

5. The wearable display device according to claim 1, wherein a volume of the projection device is not more than 1.5 cubic centimeters.

6. A wearable display device, comprising:
an optical waveguide element; and
a projection device, comprising:
an optical engine main body, having at least one positioning structure;
at least one light emitting unit, connected to the optical engine main body and configured to emit an illumination beam;
an optical combiner, disposed in the optical engine main body and positioned at the at least one positioning structure, wherein the optical combiner is located on a transmission path of the illumination beam, and the optical combiner is configured to guide the illumination beam to form an image beam; and
a projection lens, connected to the optical engine main body, wherein the projection lens is located on a transmission path of the image beam and configured to project the image beam to the optical waveguide element,
wherein the optical engine main body has a plurality of connecting surfaces, the at least one light emitting unit and the projection lens are respectively connected to the plurality of connecting surfaces, wherein at least one of the plurality of connecting surfaces has at least one dispensing groove.

7. A projection device, comprising:
an optical engine main body, having at least one positioning structure, at least one first positioning portion, a positioning surface and a plurality of connecting surfaces, wherein the at least one first positioning portion comprises at least one of a positioning hole and a positioning groove, each of the plurality of connecting surfaces is adjacent to the positioning surface, and the at least one first positioning portion is located on the positioning surface;
at least one light emitting unit, connected to the optical engine main body and configured to emit an illumination beam;
an optical combiner, disposed in the optical engine main body and positioned at the at least one positioning structure, wherein the optical combiner is located on a transmission path of the illumination beam, and the optical combiner is configured to guide the illumination beam to form an image beam; and
a projection lens, connected to the optical engine main body, wherein the projection lens is located on a transmission path of the image beam and configured to project the image beam, and the at least one light emitting unit and the projection lens are respectively connected to the plurality of connecting surfaces.

8. The projection device according to claim 7, wherein the at least one light emitting unit has at least one second positioning portion, and the at least one second positioning portion comprises at least one of a positioning hole and a positioning edge.

9. The projection device according to claim 8, wherein the at least one light emitting unit comprises a light emitting assembly and a back plate, the back plate has a front surface and a back surface opposite to each other, the front surface faces the optical engine main body, the light emitting assembly is disposed on the front surface, and the at least one second positioning portion is located on the back surface.

10. The projection device according to claim 7, wherein the at least one positioning structure comprises at least one of a positioning chute, a positioning hole, and a positioning block.

11. The projection device according to claim 7, wherein a volume of the projection device is not more than 1.5 cubic centimeters.

12. A projection device, comprising:
an optical engine main body, having at least one positioning structure;
at least one light emitting unit, connected to the optical engine main body and configured to emit an illumination beam;
an optical combiner, disposed in the optical engine main body and positioned at the at least one positioning structure, wherein the optical combiner is located on a transmission path of the illumination beam, and the optical combiner is configured to guide the illumination beam to form an image beam; and
a projection lens, connected to the optical engine main body, wherein the projection lens is located on a transmission path of the image beam and configured to project the image beam,
wherein the optical engine main body has a plurality of connecting surfaces, the at least one light emitting unit and the projection lens are respectively connected to the plurality of connecting surfaces, wherein at least one of the plurality of connecting surfaces has at least one dispensing groove.

* * * * *